US008028095B1

United States Patent
Lo et al.

(10) Patent No.: US 8,028,095 B1
(45) Date of Patent: *Sep. 27, 2011

(54) MULTI-SPEED SERIAL INTERFACE FOR MEDIA ACCESS CONTROL AND PHYSICAL LAYER DEVICES

(75) Inventors: William Lo, Cupertino, CA (US); Nafea Bishara, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/229,376

(22) Filed: Aug. 22, 2008

Related U.S. Application Data

(60) Continuation of application No. 11/891,930, filed on Aug. 14, 2007, now Pat. No. 7,418,514, which is a division of application No. 10/646,601, filed on Aug. 21, 2003, now Pat. No. 7,343,425.

(60) Provisional application No. 60/449,328, filed on Feb. 21, 2003.

(51) Int. Cl.
*G06F 15/16* (2006.01)

(52) U.S. Cl. ........ 709/246; 709/231; 709/232; 709/233; 370/466; 370/467; 370/419; 370/392; 370/257; 370/258; 370/403; 370/370; 370/421; 370/474; 370/470; 341/50; 341/51

(58) Field of Classification Search .................. 709/231, 709/233, 204, 205, 244–456, 238; 370/466, 370/467, 392, 419, 257, 258, 403, 405, 421, 370/260, 261, 290, 465, 474; 341/50, 51; 340/102, 470, 476

See application file for complete search history.

(56) References Cited

U.S. PATENT DOCUMENTS

| | | | |
|---|---|---|---|
| 3,376,385 A | 4/1968 | Smith | |
| 4,486,740 A | 12/1984 | Seidel | |
| 4,694,407 A | 9/1987 | Ogden | |
| 5,504,757 A | 4/1996 | Cook et al. | |
| 5,668,948 A | 9/1997 | Belknap et al. | ............... 709/231 |
| 5,896,417 A | 4/1999 | Lau | |
| 6,023,472 A | 2/2000 | Kupchik et al. | ............... 370/446 |

(Continued)

FOREIGN PATENT DOCUMENTS

WO WO 01/41339 A2 7/2001

OTHER PUBLICATIONS

IEEE Standard 802.3, IEEE Standard for Information technology—Telecommunications and information exchange between systems—Local and metropolitan area networks—Specific requirements, Part 3: Carrier sense multiple access with collision detection (CSMA/CD) access method and physical layer specifications, Mar. 8, 2002, pp. 1-173.

(Continued)

*Primary Examiner* — Carl Colin
*Assistant Examiner* — Mohammad A Siddiqi

(57) ABSTRACT

A network device includes a media access control (MAC) device that transmits a first data stream at a first data rate, the first data stream including first symbols having M bits. A translator converts the first data stream to a second data stream at a second data rate. The translator includes a data appender that appends N bits to the first symbols in the first data stream to generate second symbols having M+N bits. A data duplicator duplicates the second symbols X times to produce the second data stream at the second data rate. M and X are integers greater than one, and N is greater than or equal to zero.

19 Claims, 7 Drawing Sheets

U.S. PATENT DOCUMENTS

| | | | |
|---|---|---|---|
| 6,301,288 B1 | 10/2001 | Molev-Shteiman | |
| 6,310,882 B1 | 10/2001 | Lorenz et al. | 370/401 |
| 6,345,310 B1 | 2/2002 | Allison et al. | |
| 6,377,645 B1 | 4/2002 | Chen et al. | |
| 6,385,208 B1 * | 5/2002 | Findlater et al. | 370/419 |
| 6,490,281 B1 | 12/2002 | Abler et al. | |
| 6,516,352 B1 | 2/2003 | Booth et al. | |
| 6,529,529 B1 | 3/2003 | Tohkairin | |
| 6,944,163 B2 | 9/2005 | Bottorff et al. | 370/395.5 |
| 7,013,084 B2 | 3/2006 | Battou et al. | |
| 7,020,729 B2 | 3/2006 | Taborek et al. | |
| 7,068,650 B1 * | 6/2006 | Bachar et al. | 370/380 |
| 7,227,869 B2 * | 6/2007 | Findlater et al. | 370/419 |
| 7,330,901 B2 | 2/2008 | Yoneda et al. | |
| 7,343,425 B1 * | 3/2008 | Lo et al. | 709/246 |
| 7,418,514 B1 * | 8/2008 | Lo et al. | 709/230 |
| 7,440,475 B2 | 10/2008 | Kubo et al. | |
| 7,668,672 B2 | 2/2010 | Blanc et al. | |
| 2002/0075845 A1 | 6/2002 | Mullaney | |
| 2002/0194415 A1 | 12/2002 | Lindsay et al. | |
| 2004/0028164 A1 | 2/2004 | Jiang et al. | |
| 2004/0114638 A1 | 6/2004 | Matsuura et al. | 370/537 |
| 2005/0036524 A1 | 2/2005 | Wojtowicz | |
| 2005/0135434 A1 | 6/2005 | Choi et al. | |

OTHER PUBLICATIONS

IEEE Standard 802.3, IEEE Standard for Information technology—Telecommunications and information exchange between systems—Local and metropolitan area networks—Specific requirements; Part 3: Carrier sense multiple access with collision detection (CSMA/CD) access method and physical layer specifications, Mar. 8, 2002, pp. 147-249.

IEEE Standard 802.3z, In IEEE 802.3, "Part 3: Carrier sense multple access with collision detection (CSMA/CD) access method and physical layer specifications," Sections 34-39, 41-42, pp. 1-146, 250-281; Mar. 8, 2002.

* cited by examiner

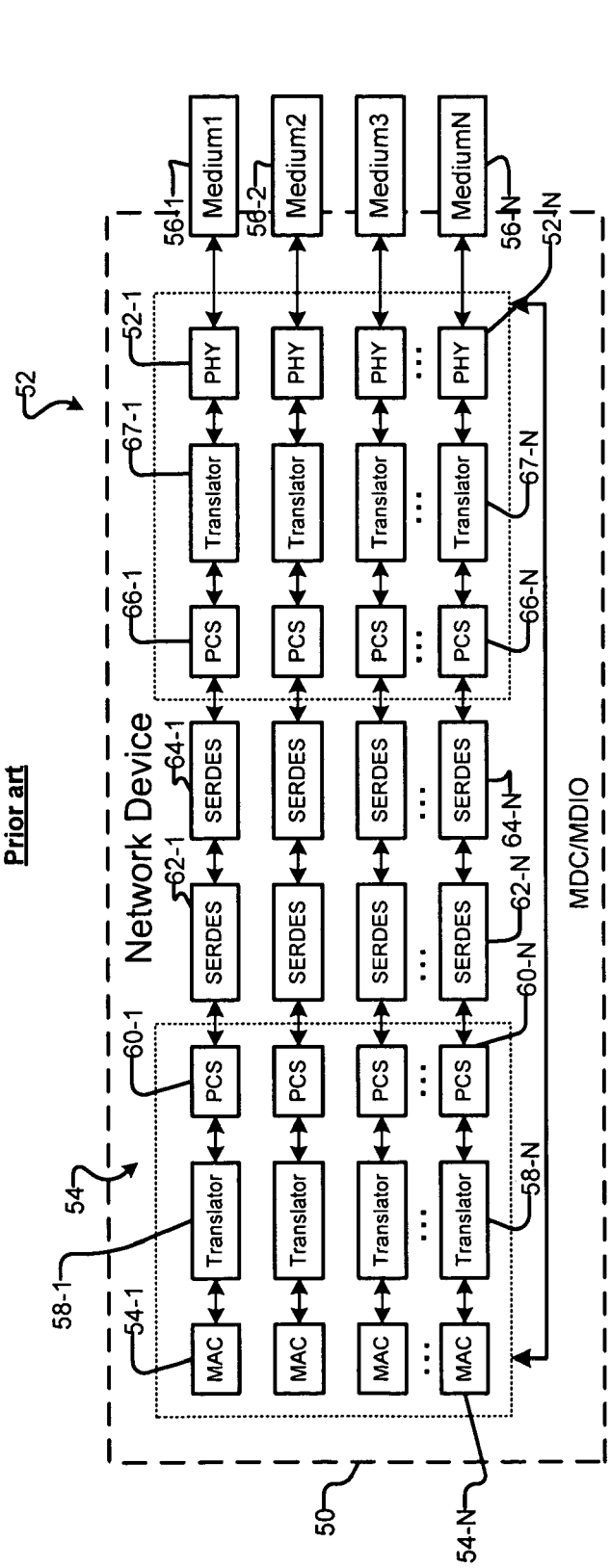
FIG. 2
Prior art
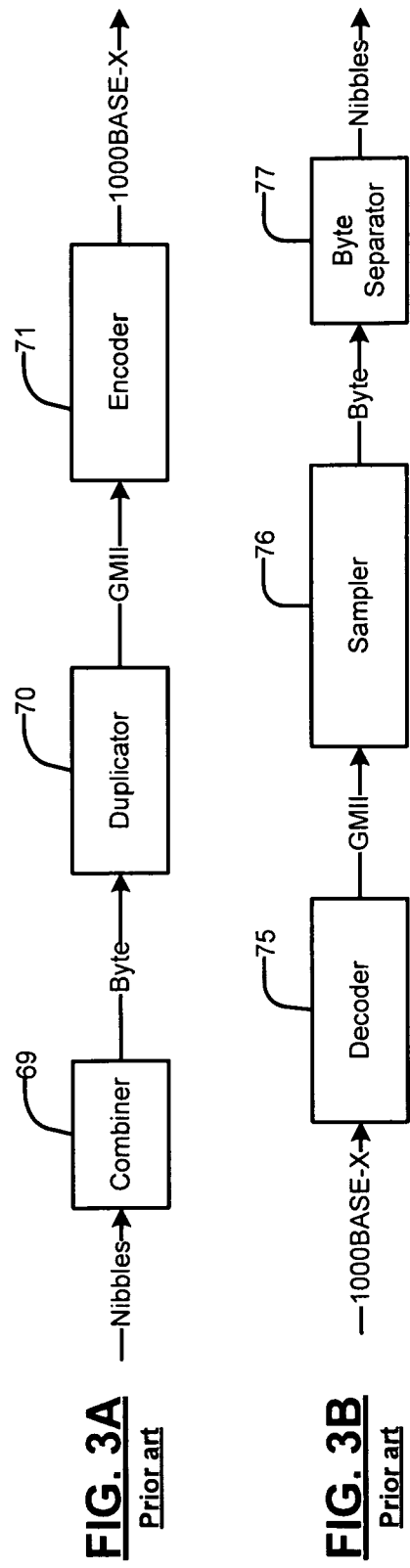
FIG. 3A
Prior art
FIG. 3B
Prior art

| Upper Nibble | Lower Nibble | First 5 or 50 bytes sent | Next 5 or 50 bytes sent | Comment |
|---|---|---|---|---|
| Data B | Data A | 0101[Data A] | 0101[Data B] | Normal packet data. |
| Idle | Don't Care | Idle | Idle | Drop nibble. |
| False Carrier | Don't care | Idle | Idle | Cannot transmit a false carrier on SERDES. |
| Don't Care | False Carrier | Idle | Idle | Cannot transmit a false carrier on SERDES. |
| Symbol Error | Don't Care | Symbol Error | Symbol Error | The lower nibble is replaced with symbol error. |
| Non-Idle | Symbol Error | Symbol Error | Symbol Error | The upper nibble is replaced with symbol error. |
| Non-Idle | Idle | N/A | N/A | This condition is impossible since first non-idle will always be placed in the lower nibble. |

FIG. 7

MULTI-SPEED SERIAL INTERFACE FOR MEDIA ACCESS CONTROL AND PHYSICAL LAYER DEVICES

CROSS-REFERENCE TO RELATED APPLICATIONS

This application is a Continuation of U.S. Ser. No. 11/891,930, filed Aug. 14, 2007, now U.S. Pat. No. 7,418,514, issued on Aug. 26, 2008, which is a Divisional of U.S. Ser. No. 10/646,601, filed Aug. 21, 2003, now U.S. Pat. No. 7,343,425, issued on Mar. 11, 2008, which application claims the benefit of U.S. Provisional Application No. 60/449,328, filed Feb. 21, 2003. The disclosures of the above applications are incorporated herein by reference.

FIELD OF THE INVENTION

The present invention relates to network devices, and more particularly to an interface between a media access control (MAC) device and a physical layer (PHY) device.

BACKGROUND OF THE INVENTION

Conventional Gigabit Ethernet switches use a Gigabit media independent interface (GMII) to link media access control (MAC) and physical layer (PHY) devices. GMII is a parallel interface that includes traces that run simultaneously at a fixed frequency between the paired MAC and PHY devices. The GMII interface works well for Gigabit Ethernet switches with one port or with relatively few ports. When additional ports are added, problems may arise relating to the relatively high number of pins, synchronization, cost and interference.

A reduced GMII (RGMII) decreased the number of pins by increasing the data frequency. The lower number of pins reduced the cost. However, running more energy through each trace increased the likelihood of interference. A serial gigabit interface was developed to solve problems associated with the GMII and RGMII parallel interfaces. One version of serial gigabit interface employs eight pins per port, which are allocated to four channels. Pairs are used for the receive (Rx) data, Rx clock, transmit (Tx) data, and Tx clock. The serial gigabit interface employs a low voltage differential swing (LVDS) format.

While parallel connections allow high data rates over short distances, serial links permit longer connections and reduce synchronization issues. Despite having a higher transmit frequency, interference is not as problematic because the signals do not travel in synch. Another version of the serial gigabit interface embeds the clock signal within the data channel and further reduces the number of pins per port to 4. The pins support two data streams, Rx and Tx, each with a single pair of pins. One pin in each pair is dedicated to the signals moving from the MAC device to the PHY device. Another pin is dedicated to traffic moving in the opposite direction, from the PHY device to the MAC device. This format also typically uses the LVDS format. The serial gigabit interface format also allows serializer/deserializer (SERDES) components to be integrated on the same chip.

Referring now to FIG. 1, a network device 10 includes a MAC device 12, which includes a gigabit MAC 14 and a physical coding sublayer (PCS) device 16, which implements IEEE section 802.3z, which is hereby incorporated by reference in its entirety. An output of the MAC device 12 is input to a first SERDES 20, which provides a serial link at a fixed data rate. A second SERDES 22 communicates with the first SERDES 20 and is connected to a PCS 26 of a PHY device 28 that includes a PHY 30. The PHY 30 communicates with a medium 34. The PCS 16 may perform 8/10 bit encoding as specified by 802.3z, which increases the data rate to 1.25 Gb/s. A serial management interface 36 provides control information between the MAC and the PHY, as specified by IEEE 802.3z. Because the first and second SERDES 20 and 22 must operate at 1.25 Gb/s, problems are encountered when the MAC 14 operates at lower data rates such as 10 or 100 Mb/s.

Referring now to FIG. 2, an exemplary network device 50 such as switch or a router includes a multi-port PHY device 52 and a multi-port MAC device 54. The PHY devices 52-1, 52-2, 52-3, . . . , and 52-N communicate with mediums 56-1, 56-2, 56-3, . . . , and 56-N. For example, the medium 56-1 may be copper operating according to 10BASE-T. The medium 56-2 may be copper operating according to 100BASE-TX. The medium 56-3 may be copper operating according to 1000BASE-T.

The MAC device 54 includes 10/100/1000 MAC devices 54-1, 54-2, . . . , and 54-N, which are connected by data translators 58-1, 58-2, 58-3, . . . , 58-N and physical coding sublayer (PCS) devices 60-1, 60-2, . . . , and 60-N (collectively referred to as PCS device 60) to SERDES 62-1, 62-2, . . . , and 62-N (collectively referred to as SERDES 62). The SERDES 62-1, 62-2, . . . , and 62-N communicate with SERDES 64-1, 64-2, . . . , and 64-N (collectively referred to as SERDES 64) that are associated with the PHY devices 52. The SERDES 64-1, 64-2, . . . , and 64-N are connected by PCS devices 66-1, 66-2, . . . , and 66-N (collectively referred to as PCS device 66) and data translators 67-1, 67-2, . . . , 67-N to PHY devices 52-1, 52-2, . . . , and 52-N. In some implementations, the PCS devices 60 and 66 perform 8/10 bit encoding and operate in accordance with IEEE section 802.3z.

Referring now to FIGS. 2, 3A and 3B, the PHY device 52 and the MAC device 54 operate using the serial gigabit interface. Control and data bytes are passed serially. Since the data rates can be 10 Mb/s (10BASE-T), 100 Mb/s (100BASE-T) and 1000 Mb/s (1000BASE-T), the 10BASE-T and 100BASE-T rates are adjusted to 1000 Mb/s to provide a common data rate for the SERDES 62 and 64. Therefore, the data translator 58 duplicates the data at 10 Mb/s 100 times and the data at 100 Mb/s 10 times. The reverse process is performed by the translator 67. The data at 1000 Mb/s is not altered by the data translators 58 and 67.

In 10 Mb/s and 100 Mb/s modes, data is typically packaged in nibbles. Prior to replicating the data, a combiner 69 combines two adjacent nibbles into a byte. A byte duplicator 70 duplicates bytes 10 times when receiving 100 Mb/s data streams and 100 times when receiving 10 Mb/s data streams. The output of the duplicator 70 is a Gigabit Media Independent Interface (GMII) data stream that is input to an encoder 71. The encoder 71 may perform 8/10 bit encoding. The encoder 71 receives the bytes from the duplicator 30 and outputs a 1000BASE-X data stream.

Going in the reverse direction, a bit decoder 75 receives the 1000-BASE-X data stream from the SERDES 62. The decoder 75 outputs a GMII data stream to a sampler 76. The sampler 76 samples 1 out of 10 bytes for 100 Mb/s and 1 out of 100 bytes for 10 Mb/s. A byte separator 77 separates the bytes into nibbles. The serial gigabit interface uses a modified form of 1000BASE-X autonegotiation to pass speed, link, and duplex information.

SUMMARY OF THE INVENTION

A network device includes a media access control (MAC) device that transmits a first data stream at a first data rate that includes symbols having M bits. A translator converts the first data stream to a second data stream at a second data rate. The translator includes a data appender that appends N bits to the symbols in the first data stream to generate second symbols having M+N bits. A data duplicator duplicates the second symbols X times to produce the second data stream at the second data rate, wherein the second data rate is equal to a product of the first data rate and $$\left(1 + \frac{N}{M}\right) \cdot X.$$

In other features, a first physical coding sublayer (PCS) device communicates with the translator and codes the second data stream received from the translator to produce a third data stream at a third data rate. A first serializer/deserializer (SERDES) receives the third data stream from the first PCS device.

In still other features, a second SERDES communicates with the first SERDES. A second PCS device communicates with the second SERDES, decodes the third data stream at the third data rate and outputs the second data stream at the second data rate. A data sampler selects one of X data symbols that are received from the second PCS. One of the X data symbols includes (M+N) bits. A data remover removes N of the (M+N) bits and outputs symbols with the M bits at the first data rate.

In still other features, a physical layer (PHY) device receives the M bits at the first data rate. The PHY device performs mode auto detection and switches between a first serial gigabit interface mode and a second serial gigabit interface mode. The first PCS device performs 8/10 bit encoding and the second PCS device performs 8/10 bit decoding. The MAC device is implemented in one of a switch and a router.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a functional block diagram of a network device including multi-port MAC and PHY devices according to the prior art;

FIGS. 3A and 3B are functional block diagrams of data translation performed according to the prior art;

FIG. 7 is a table illustrating copper to a serial gigabit interface according to the present invention.

DETAILED DESCRIPTION OF THE PREFERRED EMBODIMENTS

Figures 1, 4:
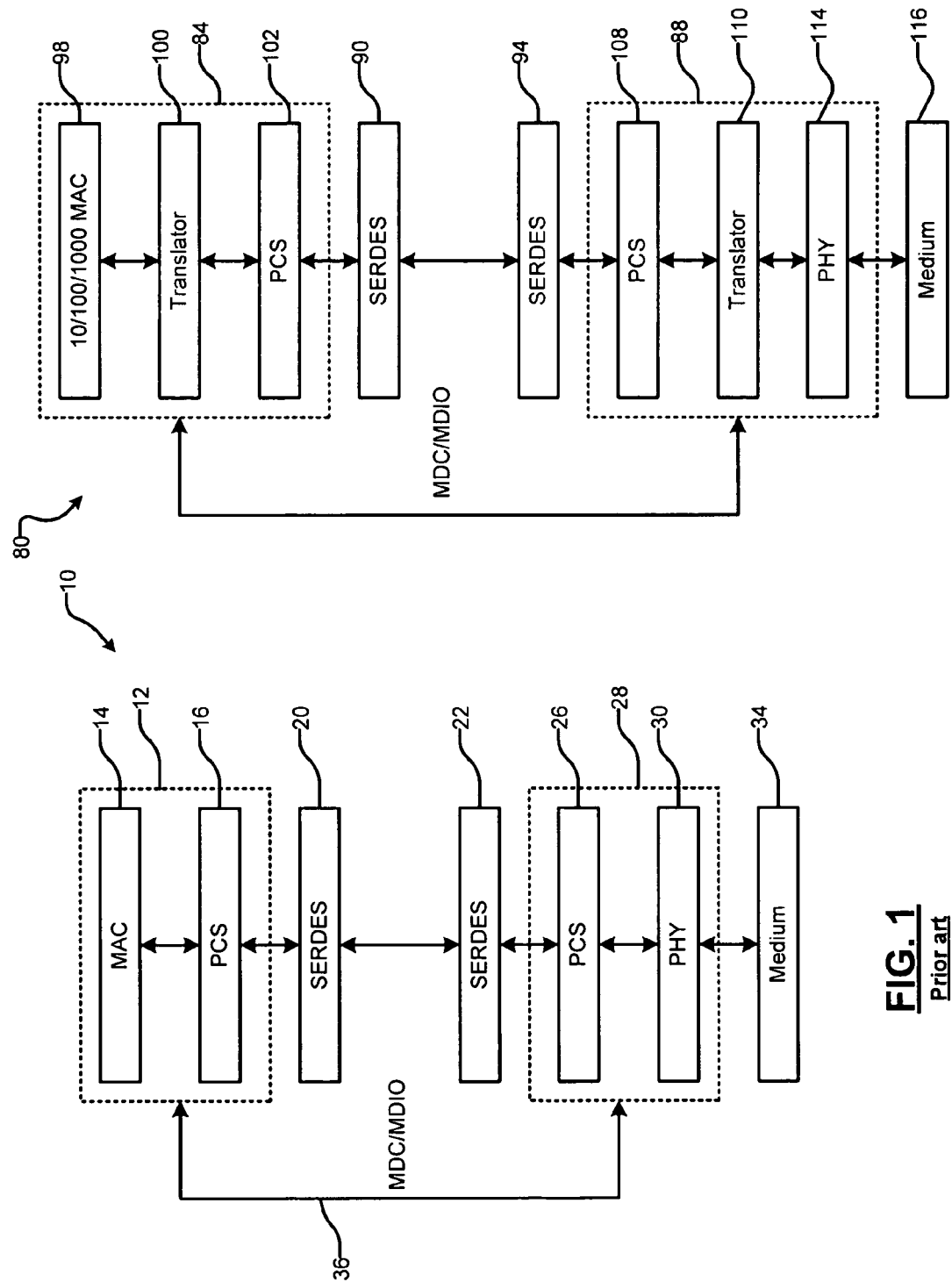
FIG. 1 is a functional block diagram of a network device that includes MAC and PHY devices that operate at 1000 Mb/s and that are connected by a SERDES according to the prior art.
FIG. 4 is a functional block diagram of a network device that includes MAC and PHY devices that operate at 10/100/1000 Mb/s and that are connected by a SERDES according to the present invention.

The following description of the preferred embodiment(s) is merely exemplary in nature and is in no way intended to limit the invention, its application, or uses. For purposes of clarity, the same reference numbers will be used in the drawings to identify the same elements.

Referring now to FIG. 4, a network device 80 according to the present invention is shown. The network device 80 includes a MAC device 84 and a PHY device 88. The MAC device 84 and the PHY device 88 are connected by SERDES 90 and 94, which operates at a fixed data rate such as 1.25 Gb/s although other data rates can be used. The MAC device 84 and the PHY device 88 are capable of operating at 10 Mb/s, 100 Mb/s and/or 1000 Mb/s, in other words, the MAC and PHY are IEEE section 802.3ab compliant.

The MAC device 84 includes a 10/100/1000 MAC 98 that communicates with a data translator 100 according to the present invention. The data translator 100 appends and duplicates data to provide the desired higher data rate. The data translator 100 outputs translated data to a PCS device 102, which codes the data. In one embodiment, the PCS 102 codes the data in accordance with IEEE 802.3z.

The PHY device 88 includes a PCS 108, which decodes the data that is received from the SERDES 94. A data translator 110 reverses the operation that was performed by the data translator 100 and outputs data to the PHY 114, which communicates with a medium 116. A MDC/MDIO 90 operates as described in IEEE section 22 of 802.3, which is hereby incorporated by reference in its entirety.

Figure 5A:
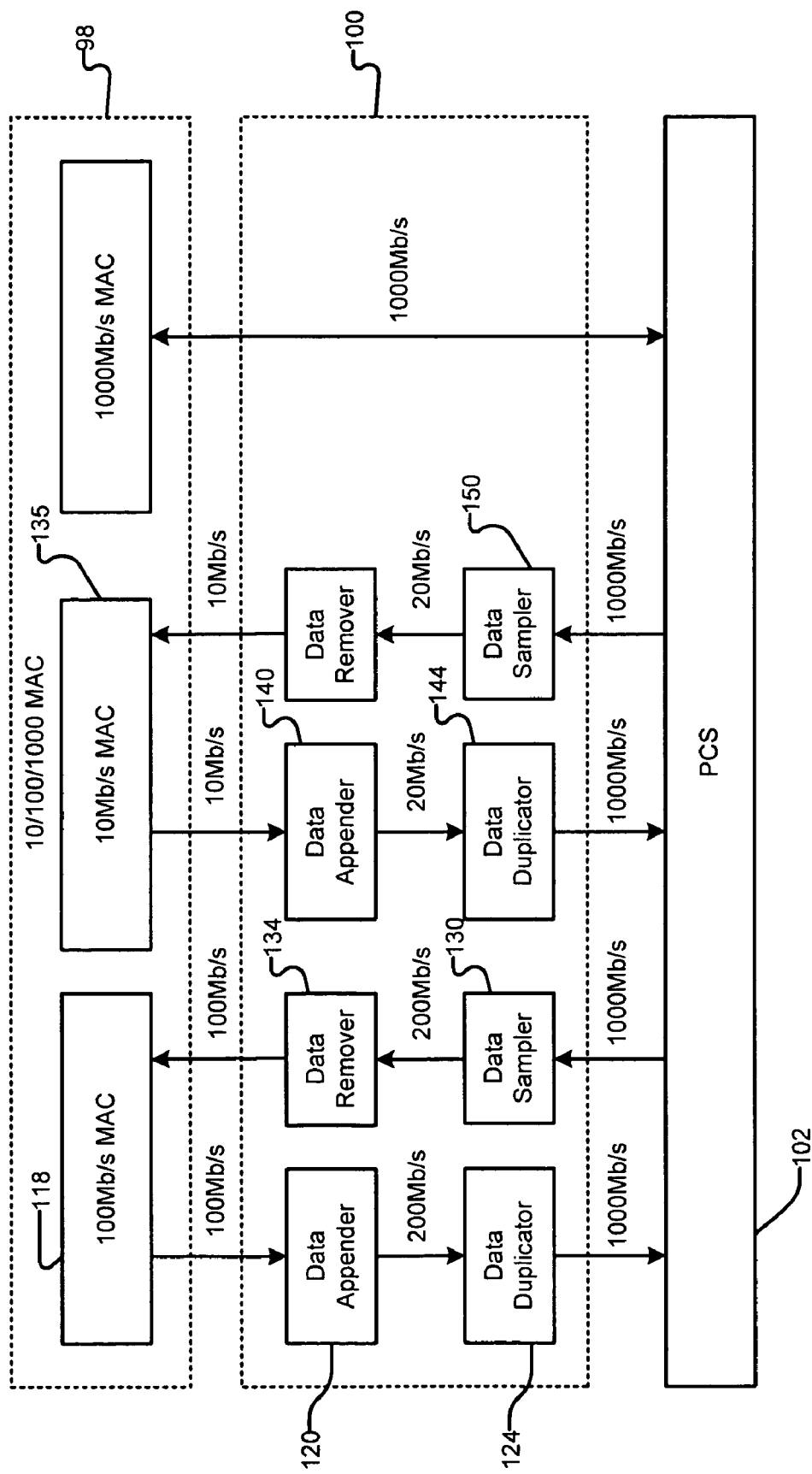
FIGS. 5A and 5B illustrate data translators according to the present invention in further detail.
Figure 5B:
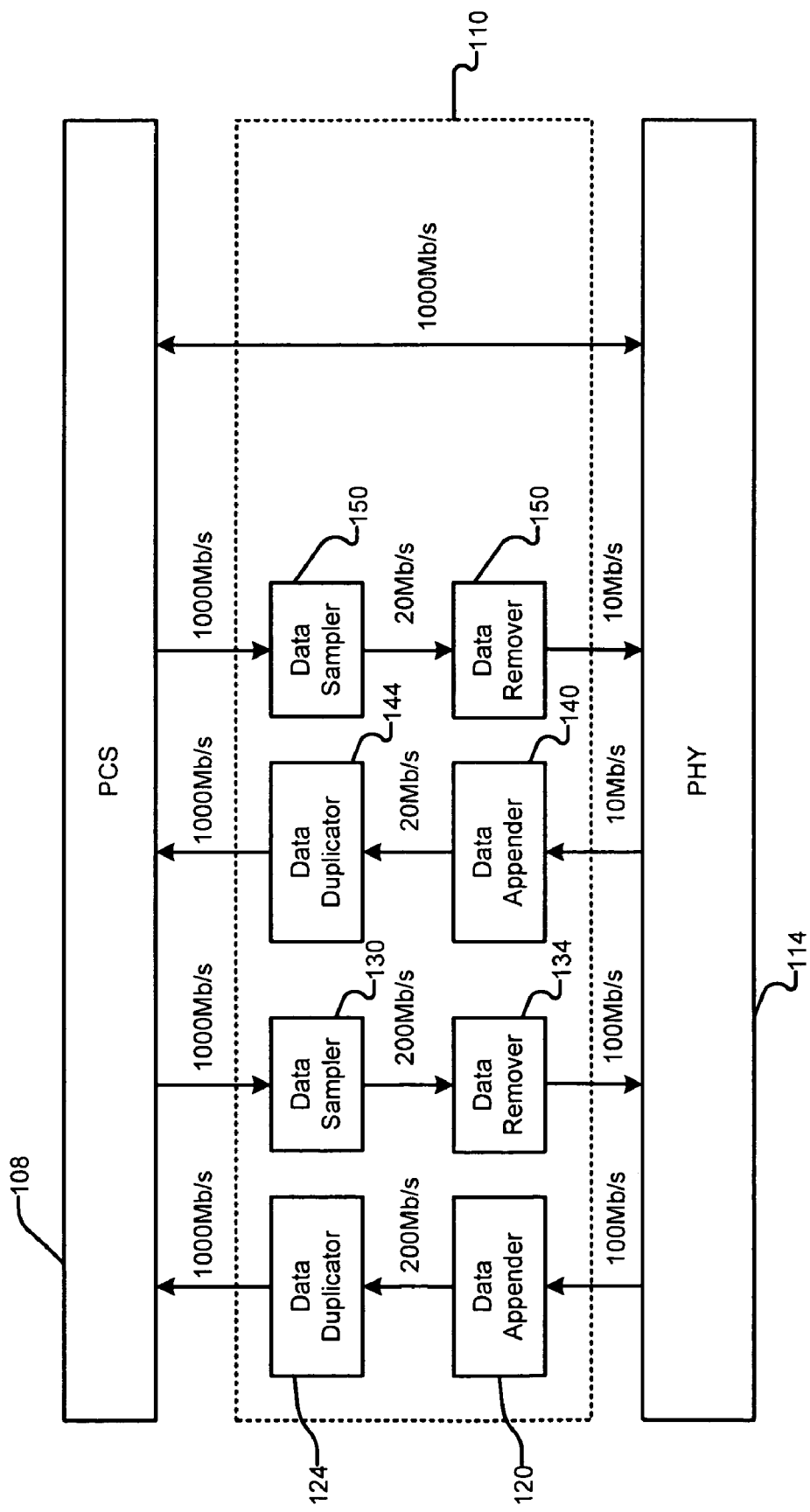

Referring now to FIGS. 5A and 5B, the data translator 100 is shown in further detail. When the MAC 98 is operating at 1000 Mb/s, the data translator 100 passes the data (without change) to the PCS 102. In one embodiment, the PCS 102 encodes the output of the data translator 100 using 8/10 bit encoding that is IEEE 802.3z compliant. In one implementation, Tx_Err/Rx_Err are encoded in a /V/ ordered set.

When the MAC 98 is operating at 100 Mb/s, the MAC 98 outputs nibbles (4 bits) at a rate of 100 Mb/s. The data translator 100 includes a data appender 120 that appends 4 additional bits to form a byte, which increases the data rate to 200 Mb/s. Any 4 bit pattern can be used. For example, 0101 can be added to the MSB positions and the nibble can be located in the LSB positions. The 4 appended bits can also be located in the LSB positions, in the middle of the byte, and/or interspersed. The output of the data appender 120 is input to a data duplicator 124. The data duplicator 124 duplicates the bytes five times to generate an output data stream at 1000 Mb/s, which is output to the PCS 102. The PCS 102 encodes the data and outputs the data to the SERDES 90. In one embodiment, the PCS 102 encodes the data using an 8/10 bit encoder in accordance with IEEE section 802.3z.

In one implementation, in both 10/100 modes, MII collision information is derived from the status of the Rx_Dv and Tx_En signals. In both 10/100 modes, Tx_En and Tx_Err are repeated 50/5 times, respectively.

Data flowing in the opposite direction from the PCS 102 to the MAC 98 is decoded in an opposite manner. The data sampler 130 samples one of every 5 bytes of the data and outputs data at 200 Mb/s. A data remover 134 removes the appended 4 bits, recovers the nibble and the data rate is reduced to 100 Mb/s.

When the MAC 98 operates at 10 Mb/s (as shown at 135), the MAC 98 sends data to a data appender 140 and a data duplicator 144, which operate in a manner that is similar to the data appender 120 and the data duplicator 124. However, the data duplicator 124 duplicates the data 50 times instead of 5 times. Continuing with the example set forth above, the MAC 98 outputs data at 10 Mb/s to the data appender 140, which appends 4 bits to each received nibble. The data duplicator 144 duplicates the data 50 times. The PCS 102 encodes the data as described above and outputs the encoded data to the SERDES 90. In the opposite direction, a data sampler 150 samples one of every 50 bytes and outputs data at 20 Mb/s. A data remover 154 removes one or more appended bits to recover the nibbles and the data rate is reduced to 10 Mb/s. In FIG. 5B, the translator 110 reverses the steps performed by the translator 100.

In the exemplary embodiment shown in FIGS. 4, 5A and 5B, no special control information is passed in-band over the SERDES path. MAC/PHY autonegotiation procedure and status reporting is performed through the MDC/MDIO, as described in the IEEE section 802.3 specification, which is an out of band signal. The link status going to the MAC layer is based on a link read from the PHY and the PCS Sync_OK signal from the 802.3z PCS device.

Figure 6:
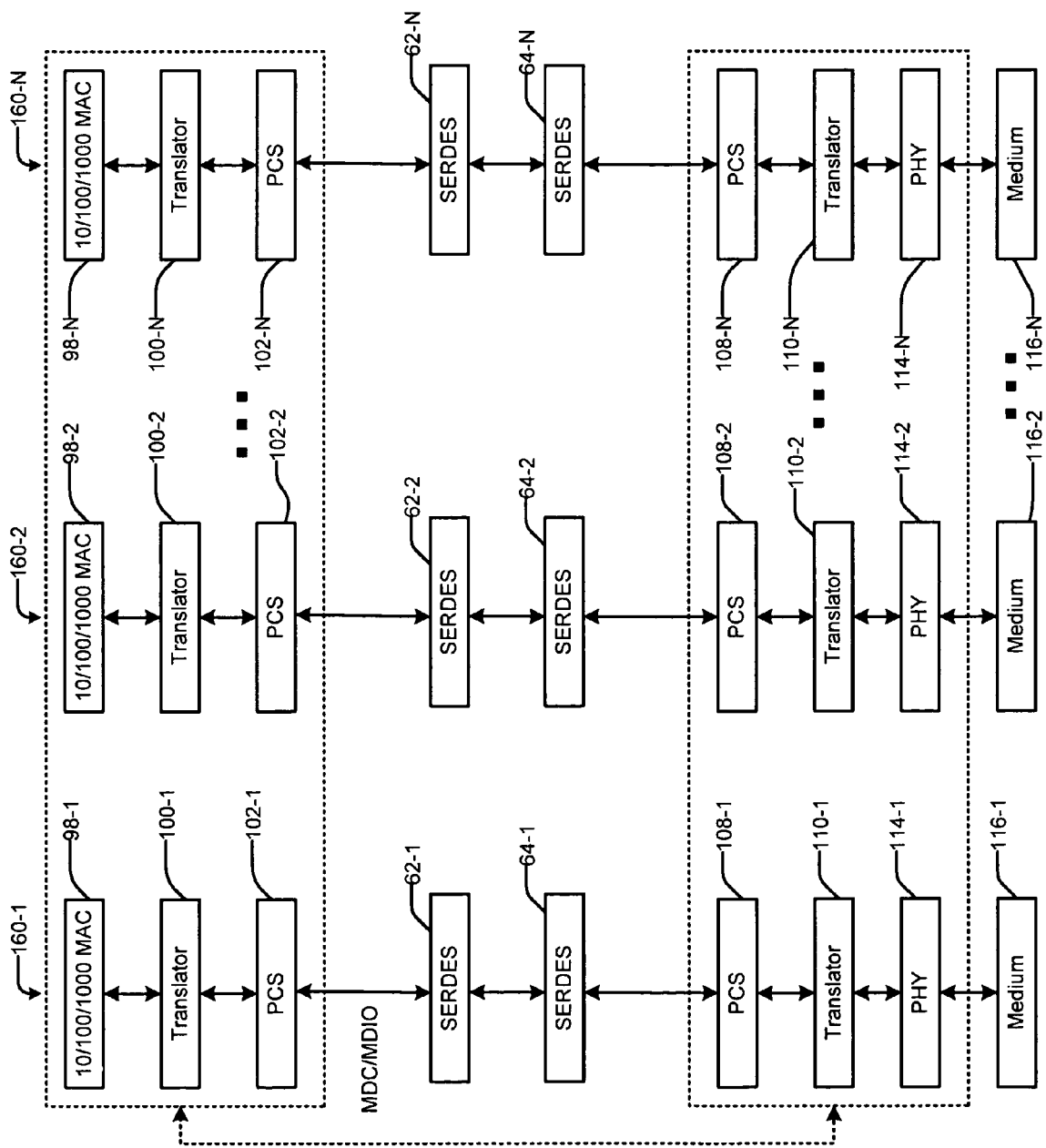
FIG. 6 illustrates a multi-port implementation of the MAC/PHY pair according to the present invention.
Figure 8:
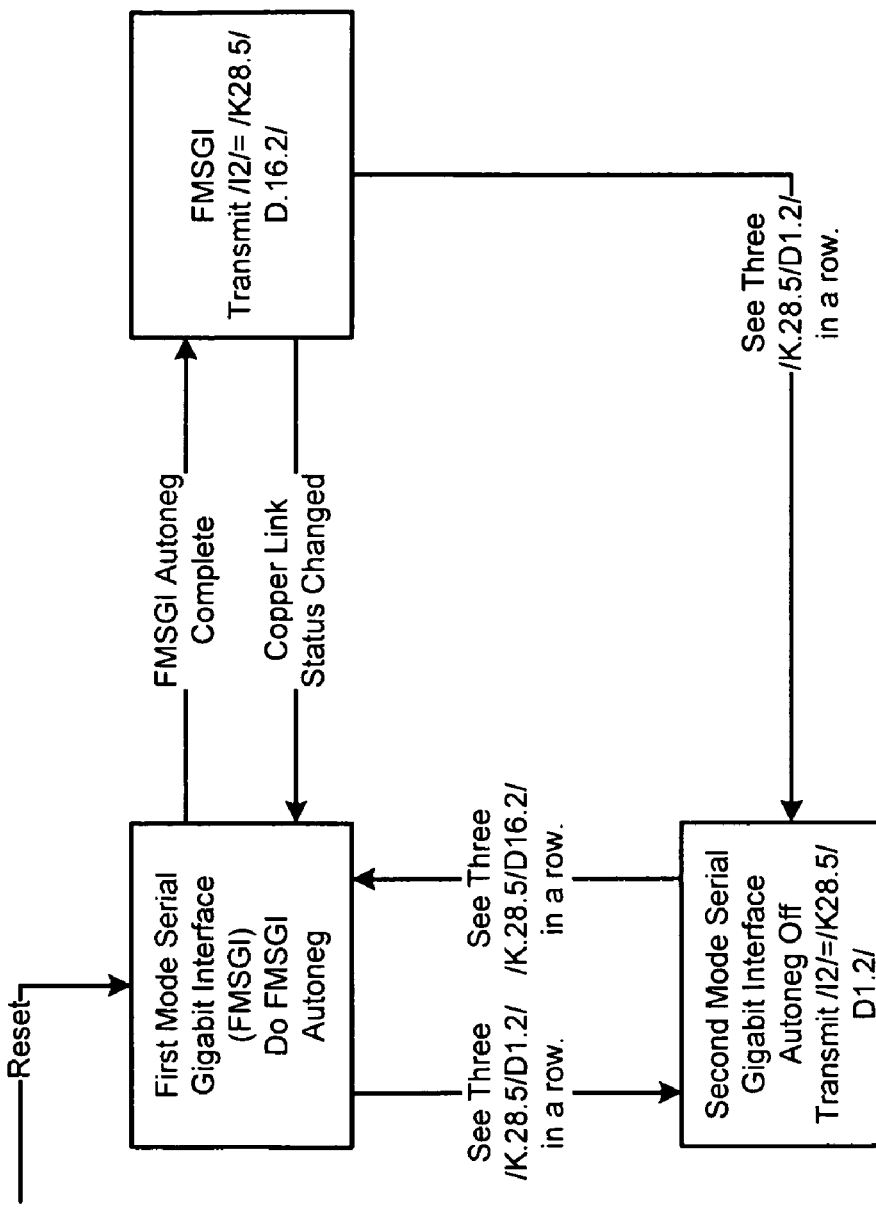
FIG. 8 is an autodetection state machine for switching between a conventional serial gigabit interface and the serial gigabit interface according to the present invention.

Referring now to FIG. 6, an exemplary multi-port implementation is shown. A first port 160-1 includes the MAC 98-1, the translator 100-1, the PCS 102-1, the SERDES 62-1 and 64-1, the PCS 108-1, the translator 110-1 and the PHY 114-1. The PHY 114-1 is connected to the medium 116-1. A second port 160-2 includes the MAC 98-2, the translator 100-2, the PCS 102-2, the SERDES 62-2 and 64-2, the PCS 108-2, the translator 110-2 and the PHY 114-2. The PHY 114-2 is connected to the medium 116-2. An nth port 160-N includes the MAC 98-N, the translator 100-N, the PCS 102-N, the SERDES 62-N and 64-N, the PCS 108-N, the translator 110-N and the PHY 114-N. The PHY 114-N is connected to the medium 116-N.

If one of the nibbles is a control symbol, then the byte that is presented to the 1000BASE-X PCS is mapped according to FIG. 7 below. Data nibbles can be replaced by control symbols. Even though data is passed one nibble at a time instead of one byte at a time, the start of frame delimiter (SFD) and the bytes in the frame preferably line up in the correct even/odd nibble boundary. In one embodiment, an extra nibble is inserted (if needed) to line up the SFD with the frame boundary.

Since idle code in the 1000BASE-X side is 2 bytes long, the first of the five (or 50) bytes of the preamble may be deleted (similar to the conventional serial gigabit interface described above possibly dropping the first of 10 (or 100) bytes). The circuit should be tolerant of the byte loss. During idles, the number of idle symbols need not be divisible by 5 or 50. Therefore, the circuit must be able to tolerate any number of idle symbols (of course with some lower bound) between packets.

In one implementation, the PHY device is able to automatically detect whether the incoming data stream is in a first or conventional serial gigabit interface mode or the second serial gigabit interface mode described herein. The switch side indicates the first serial gigabit interface mode or the second serial gigabit interface mode but does not auto detect.

In 1000BASE-X, the idle order set normally runs with the disparity negative prior to transmitting a first idle order set, such as the /K28.5/D16.2/idle order set. If a packet ends in a positive disparity, then a second idle order set (such as the /K28.5/D5.6/idle order set) is sent to make the disparity negative again. Afterwards/K28.5/D16.2/is sent as long as there is idle on the line to keep the ending disparity negative.

On the switch side, the /K28.5/D16.2/idle order set is replaced by the /K28.5/D1.2/idle order set when in the second serial gigabit interface mode. If the PHY device sees the /K28.5/D1.2/idle order set three times in a row, the PHY device switches into the second serial gigabit interface mode. While in the second serial gigabit interface mode, the PHY turns off the first serial gigabit interface autonegotiation and starts to transmit the /K28.5/D1.2/idle order set instead of /K28.5/D16.2/idle order set. If the PHY subsequently sees /K28.5/D16.2/idle order set three times in a row, the PHY switches to the first serial gigabit interface mode and then forces a restart of autonegotiation in the first serial gigabit interface mode.

When switching back and forth between first serial gigabit interface mode and the second serial gigabit interface mode, there is no need to check whether a packet is active prior to switching. Preferably, the switching takes effect immediately. Note that the /K28.5/D5.6/idle order set should be output as is.

In a preferred embodiment, the /K28.5/D1.2/idle order set is chosen to replace the /K28.5/D16.2/idle order set to prevent disparity differences. Also there is minimal bit pattern difference in the 10 bit code. The /K28.5/D1.2/idle order set is 100010_0101, 011101_0101. The /K28.5/D16.2/idle order set is 100100_0101, 011011_0101. Note that this substitution should only apply in the context of the idle order sets and does not apply when sending packet data or sending configuration ordered sets.

In the second serial gigabit interface mode, link, speed, and duplex information are passed out of band via the MDC/MDIO. In the first serial gigabit interface mode, once the PHY links up, autonegotiation in the first serial gigabit interface mode is initiated to pass on the link information prior to packets being forwarded. In second serial gigabit interface mode, the PHY forwards packets immediately. It is up to the switch to ignore these packets until the switch polls the link status via MDC/MDIO. It is also assumed that the switch will not transmit any packets prior to receiving the correct speed information of the PHY.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A network device comprising:
   a media access control (MAC) device configured to transmit a first data stream at a first data rate, the first data stream including first symbols having M bits; and
   a translator configured to convert the first data stream to a second data stream at a second data rate, wherein the translator includes:
   a data appender configured to append N bits to the first symbols in the first data stream to generate second symbols having M+N bits, and
   a data duplicator configured to duplicate the second symbols X times to produce the second data stream at the second data rate, wherein M and X are integers greater than one, and N is greater than or equal to one.

2. The network device of claim 1, further comprising a first physical coding sublayer (PCS) device in communication with the translator, wherein the first physical coding sublayer (PCS) device is configured to code the second data stream received from the translator to produce a third data stream at a third data rate.

3. The network device of claim 2, further comprising a first serializer/deserializer (SERDES) configured to receive the third data stream from the first physical coding sublayer (PCS) device.

4. The network device of claim 3, further comprising a second serializer/deserializer (SERDES) in communication with the first serializer/deserializer (SERDES).

5. The network device of claim 4, further comprising a second physical coding sublayer (PCS) device in communication with the second serializer/deserializer (SERDES), wherein the second physical coding sublayer (PCS) device, is configured to i) decode the third data stream at the third data rate and ii) output the second data stream at the second data rate.

6. The network device of claim 5, further comprising a data sampler configured to select one of X data symbols that are received from the second physical coding sublayer (PCS), wherein the one of the X data symbols includes M bits.

7. The network device of claim 6, further comprising a physical layer (PHY) device configured to receive the M bits at the first data rate.

8. The network device of claim 7, wherein the physical layer (PHY) device is configured to i) perform mode auto detection and ii) switch between a first serial gigabit interface mode and a second serial gigabit interface mode.

9. The network device of claim 5, wherein:
the first physical coding sublayer (PCS) device is configured to perform 8/10 bit encoding; and
the second physical coding sublayer (PCS) device is configured to perform 8/10 bit decoding.

10. The network device of claim 1, wherein the media access control (MAC) device is implemented in one of a switch or a router.

11. A method for operating a network device, the method comprising:
transmitting a first data stream at a first data rate, wherein the first data stream includes first symbols having M bits; and
converting the first data stream to a second data stream at a second data rate by:
appending N bits to the first symbols in the first data stream to generate second symbols having M+N bits, and
duplicating the second symbols X times to produce the second data stream at the second data rate, wherein M and X are integers greater than one, and N is greater than or equal to one.

12. The method of claim 11, further comprising coding the second data stream using a first physical coding sublayer (PCS) device to produce a third data stream at a third data rate.

13. The method of claim 12, further comprising receiving the third data stream from the first physical coding sublayer (PCS) device at a first serializer/deserializer (SERDES).

14. The method of claim 13, further comprising providing a second serializer/deserializer (SERDES) configured to communicate with the first serializer/deserializer (SERDES).

15. The method of claim 14, further comprising decoding the third data stream at the third data rate and outputting the second data stream at the second data rate using a second physical coding sublayer (PCS) device.

16. The method of claim 15, further comprising selecting one of X data symbols that are received from the second physical coding sublayer (PCS), wherein the one of the X data symbols includes M bits.

17. The method of claim 16, further comprising providing a physical layer (PHY) device configured to receive the M bits at the first data rate.

18. The method of claim 17, wherein the physical layer (PHY) device is configured to i) perform mode auto detection and ii) switch between a first serial gigabit interface mode and a second serial gigabit interface mode.

19. The method of claim 15, further comprising:
performing 8/10 bit encoding using the first physical coding sublayer (PCS) device; and
performing 8/10 bit decoding using the second physical coding sublayer (PCS) device.

* * * * *